United States Patent

Tarumoto et al.

[11] Patent Number: 4,774,393
[45] Date of Patent: Sep. 27, 1988

[54] SLIDE CONTACTING MEMBER AND PRODUCTION METHOD THEREFOR

[75] Inventors: Kouji Tarumoto; Junichi Yamamoto; Yoshifumi Yamamoto, all of Hiroshima, Japan

[73] Assignee: Mazda Motor Corporation, Hiroshima, Japan

[21] Appl. No.: 37,957

[22] Filed: Apr. 13, 1987

[30] Foreign Application Priority Data

Apr. 28, 1986 [JP] Japan ................................ 61-98538

[51] Int. Cl.$^4$ ............................................. B23K 26/14
[52] U.S. Cl. ........................... 219/121.69; 219/121.84; 219/121.85
[58] Field of Search .... 219/121 L, 121 LM, 121 LH, 219/121 LJ, 121 LE, 121 LF, 121 FS

[56] References Cited

U.S. PATENT DOCUMENTS

| | | | |
|---|---|---|---|
| 4,200,382 | 4/1980 | Friedman | 219/121 LJ X |
| 4,322,600 | 3/1982 | Crahay | 219/121 LH X |
| 4,628,179 | 12/1986 | Crahay | 219/121 LH |
| 4,686,349 | 8/1987 | Kawazu et al. | 219/121 LE X |

FOREIGN PATENT DOCUMENTS

| | | | |
|---|---|---|---|
| 3608286 | 10/1986 | Fed. Rep. of Germany | 219/121 LW |
| 59-25841 | 6/1984 | Japan. | |
| 60-3431 | 1/1985 | Japan. | |

Primary Examiner—C. L. Albritton
Attorney, Agent, or Firm—Burns, Doane, Swecker & Mathis

[57] ABSTRACT

A slide contacting member which is subjected to slide contact with a counter member. The slide contacting member is made by applying a hard layer, e.g., chromium, onto a parent material, irradiating the hard layer with a high energy density laser beam onto the plating under conditions such that concavities having a softened layer are formed thereon, the concavities being used to keep oil during the contact with the other member. The hard layer is finished grinded after irradiation.

4 Claims, 3 Drawing Sheets

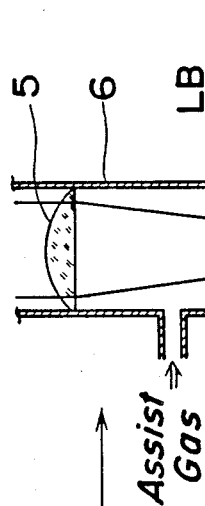
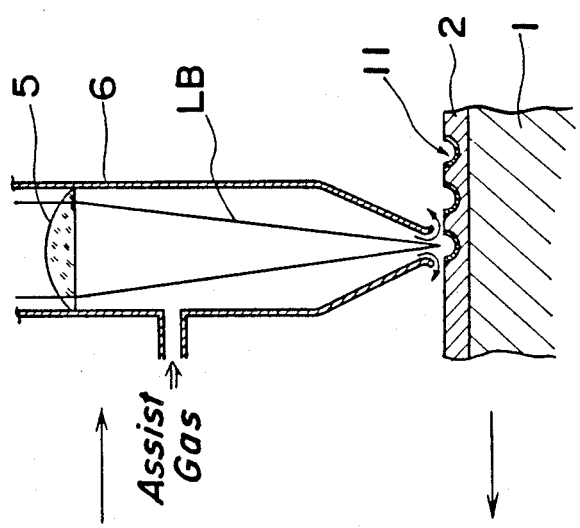
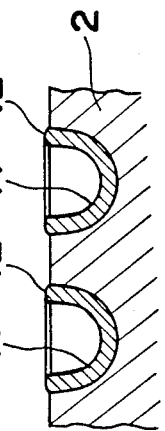
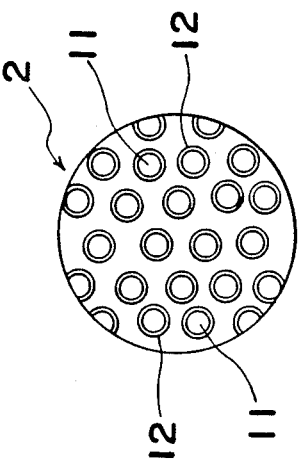

SLIDE CONTACTING MEMBER AND PRODUCTION METHOD THEREFOR

BACKGROUND OF THE INVENTION

1. Field of the Invention

The present invention relates to slide contacting members having slide contacting surfaces with a high abrasion resistance which are formed by hard plating and relates to production method therefor.

2. Description of the Prior Art

Conventionally, the hard plating has been utilized in order to improve the abrasion resistance of slide contacting surfaces of slide contacting members such as cylinder liners of a combustion engine for automobile by forming hard plated layers on the slide contacting surfaces. Usually, these slide contacting members are used in a state lubricated by oil. In order to improve the abrasion resistance of slide contacting surfaces, in other words, to reduce the wear of mating counter members which are slide contacted to the slide contacting members under a high contact pressure, there has been proposed a method for improving the holding property of oil and/or the diffusibility of oil by forming a lot of small concavities dispersed on the surface of the slide contacting member (See, for example, Japanese patent publication No. 25841/1986.).

As the method for forming small concavities, there have been proposed the porous plating with use of the reversed electrolytic process, a forming method of concavities by plating surfaces of parent material after making gouges on the surfaces mechanically and/or a method for forming concavities on plated surfaces utilizing the photo-etching process (See, for example, Japanese patent laid open publication No. 3431/1985).

FIGS. 6(a) and 6(b), show concavities 3 schematically which are formed on a hard layer 2 plated on a parent material 1 with use of said reversed electrolytic process and photo-etching process, respectively.

The slide contacting member having concavities 3 formed according to such conventional processes as mentioned above has an essential defect in that the edge portion 3a of each concavity 3 formed is liable to become acute. This causes scratches on a surface of a counter member 4 being slide contacted thereto coupled with the high hardness of the plated layer 2 and, due to these scratches, the abrasion resistance of the counter member 4 is lowered considerably.

In order to solve this problem, there has been proposed a method for forming edge portions of concavities round by repeating the photo-etching process twice.

However, this method is too time-consuming because of complicated treatments therefor.

SUMMARY OF THE INVENTION

An essential object of the present invention is to provide a slide contacting member which is able to reduce the abrasion of a counter member cooperating thereto.

Another object of the present invention is to provide a production method for the slide contacting member mentioned just above which enables to form edge portions of concavities round easily.

In order to accomplish these objects of the present invention, there is provided a slide contacting member with improved abrasion resistance having a hard plated layer formed on a surface of a parent material being characterized in that said hard plated layer has a lot of concavities formed on a slide contacting area to which a counter member is slidably contacted and that a surface layer having a low hardness is formed around the edge portion of said concavity.

According to the slide contacting member, the abrasion of a counter member due to scratches by edges of concavities of said slide contacting member is reduced considerably since these edges are formed by soft layers having been made. Therefore, the abrasion resistance of the slide contacting member is also increased.

According to the present invention, the slide contacting member with improved abrasion resistance is produced by a production method comprising following steps;

applying hard plate on a surface of a parent material to form a hard plated layer thereon and irradiating heat beams each having a high energy density at points dispersed on said hard plated layer in a discrete manner while applying pressurized assist gas to each of said points to be irradiated wherein irradiation conditions of said heat beam and the pressure of the assist gas are so chosen as to form concavities in a state dispersed on said hard plated layer each of which has a softened layer on the concave surface thereof.

According to the production method of the present invention, concavities and soft layers covering these are formed at the same time under actions of heat beams with a high energy density and the pressurized assist gas.

This enables to carry out the superficial treatment of the slide contacting member quickly and in a low cost.

BRIEF DESCRIPTION OF THE DRAWINGS

These and other objects and features of the present invention will become more apparent by the detailed explanation of the preferred embodiment of the present invention accompanying drawings wherein;

FIGS. 1(a) to 1(d) show a series of steps of a production method of a slide contacting member with improved abrasion resistance according to the present invention, FIG. 2 is an enlarged cross-sectional view for showing concavities formed according to the present invention;

FIG. 3 is a partial plan view showing concavities formed according to the present invention;

DETAILED DESCRIPTION OF THE PREFERRED EMBODIMENT

Figure 4A:
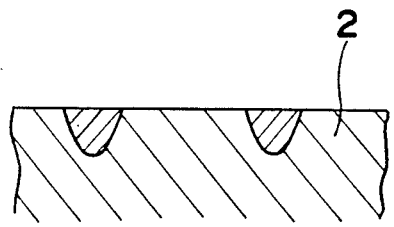
FIGS. 4(a) to 4(e) are schematical cross sectional views for showing effects of pressurized assist gas used for the present production method.

FIGS. 1(a) to 1(d) show a series of steps of a superficial treatment for a slide contacting member with use of laser beams.

In the present preferred embodiment, a rotor housing of a rotary piston combustion engine (Wankel engine) is assumed as a slide contacting member. Accordingly the slide contacting surface thereof is the trochoidal surface defined by the inner peripheral surface of the rotor housing and a counter slide contacting member is an apex seal provided at each of the apexes of the rotary piston.

As shown in FIG. 1(a), the hard chromium plate is applied to the inner peripheral surface (namely the trochoidal surface of the rotor housing as a parent material 1) in order to form a hard chromium plated layer 2. The chromium plating is done using a usual Sargent chromium plating bath under plating conditions of the bath temperature of 50° C. and of the current density of 50 A/cm$^2$. The hardness of plate obtained falls within a range from 1003 to 1048 in the Vickers hardness Hv. The thickness of plate is about 50 μm in a finished state. Chromium alloy plate which contains suitable amounts of molybdenum and tungsten or electroless nickel-phosphorous plate is also applicable to form the hard plated layer 2.

Next, as shown in FIG. 1(b), grinding or honing treatment is done so as for the hard plated layer 2 to have a uniform thickness. After that, a laser beam LB having been converged into a spot beam having a predetermined heat energy by a condenser lens 5 is irradiated as a pulse on the surface of the hard plated layer 2 while supplying a pressurized assist gas into a cylinder 6 provided for irradiating the laser beam LB. The cylinder 6 is scanned at a predetermined velocity relative to the hard plated layer 2 while irradiating the laser beam LB under a duty ratio determined so as to form a plenty of dimple-like concavities 11 dispersed with a suitable surface ratio (surface porosity) ranging from 10 to 20%.

Irradiation conditions of laser are as follows;

| | |
|---|---|
| Average output energy | 100 W |
| Scanning velocity of LB | 7.2 m/min. |
| Focal length of condensor lens | 10 inches |
| Focusing condition | In-focus state |
| Frequency of LB pulse | 300 Hz |
| Duty ratio | 20% |
| Assist gas | Nitrogen gas |
| Pressure of Assist gas | 1.0 kg/cm$^2$ |
| Volume of gas flow | 50 l/min. |

As shown in FIG. 2 in an enlarged scale, dimple like concavities 11 are formed on the hard plated layer 2 by irradiating the laser beam LB in such a manner as mentioned above. At the same time, a softened layer 12 is formed on the concave surface of each concavity 11 due to a heat action applied upon forming the concavity. The hardness of the softened layer 12 measured falls within a range from 500 to 900 in the Vickers hardness Hv.

FIG. 3 shows an enlarged plan view of the hard plated layer 2 having concavities 11 dispersed thereon.

Next, the role of pressurized assist gas acting upon forming concavities will be explained with reference to FIGS. 4(a) to 4(e). These figures show concavities formed when the pressure P of the assist gas is varied to have five values of 0.5, 1.0, 2.0, 3.0 and 4.0 (kg/cm$^2$) while holding the irradiation conditions of the laser beam same to those mentioned above. Under these conditions, the pitch of concavities formed is about 400 μm.

As shown in FIG. 4(a), when the pressure P is set equal to 0.5 (kg/cm$^2$), there is not formed any concavity although melted portions are formed by the laser beam.

Figure 4B:
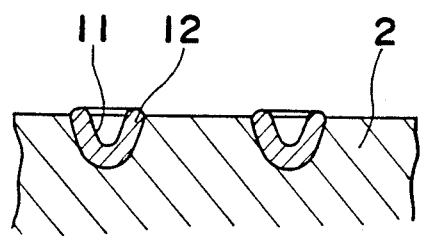
Figure 4C:
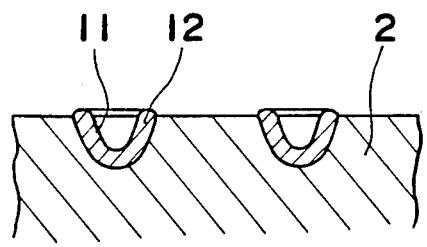
Figure 4D:
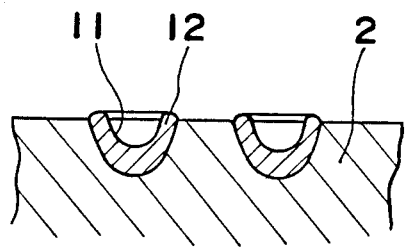
Figure 4E:
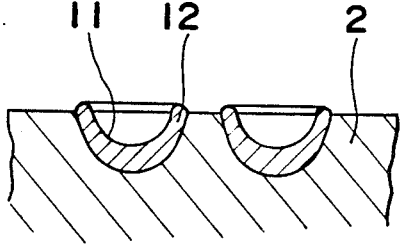

When the pressure P is set equal to 1.0 (kg/cm$^2$), relatively small concavities 11 having a diameter of about 100 μm are formed as shown in FIG. 4(b). When the pressure P is increased step-wise to 2.0, 3.0 and 4.0 (kg/cm$^2$) respectively, the diameter of the concavity formed is enlarged to 125, 150 and 230 (μm) respectively, as shown schematically in FIGS. 4(c), 4(d) and 4(e). The concavity 11 to be formed is considered desirable to have a diameter ranging from 100 to 150 μm in views of the holding property of oil and the surface ratio (porosity) of concavities 11.

Accordingly, in order to form concavities having a desirable diameter ranging from 100 to 150 (μm), it is desirable to set the pressure of assist gas to a value ranging from 1.0 to 3.0 (kg/cm$^2$).

Figure 5A:
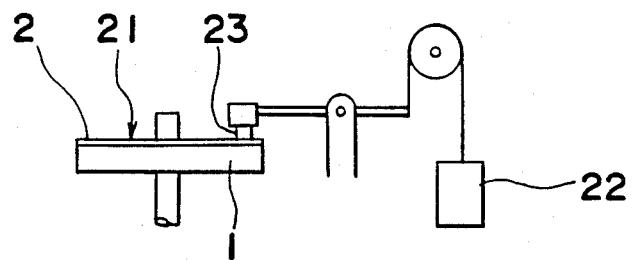
FIGS. 5(a) to 5(d) are explanative views for showing the test of abrasion resistance done about the slide contacting member made according to the present invention.

Next, the abrasion of the slide contacting member produced according to the present invention is evaluated under a lubricating oil free condition with use of an abrasion test machine of rotational type (a pin-disk abrasion test machine) as shown in FIG. 5(a).

Figure 5B:
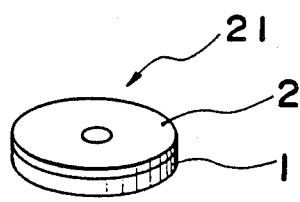
Figure 5C:
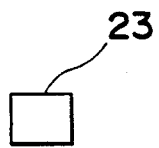
Figure 5D:
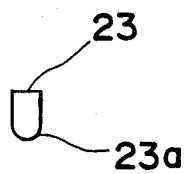
Figure 6A:
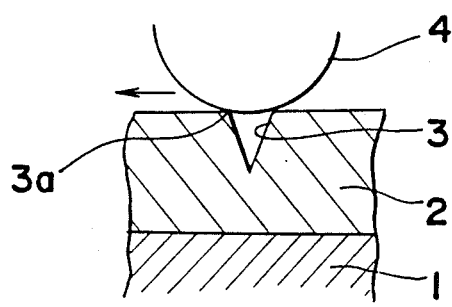
FIGS. 6(a) and 6(b) are schematical cross sectional views for showing a mechanism of the abrasion due to scratches which might be caused by edges of concavities having been formed according to the conventional methods.
Figure 6B:
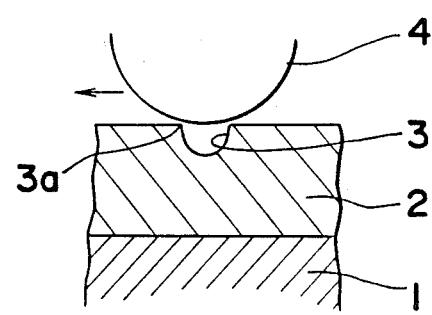

As a test piece 21, there is provided a disk having a diameter of 200 mm and a thickness of 15 mm, as shown in FIG. 5(b). In this test, the test piece 21 is rotated at a peripheral rotational velocity of 5 m/sec for ten minutes while pressing a pin 23 as a counter member on the test piece 21 to which a weight of 4.5 kg is applied via a lever of the test machine. The pin 23 is made from an alloy cast iron of C:3.5, Si:2.3, Mn:0.4, P:0.2, S: 0.02, Cr:0.5, Cu:1.0, Mo:1.5, Ni:1.0, Mg:0.01, V: 0.2, and Fe: rest (wt. %) which has been subjected to a suitable chill treatment. The hardness of the slide contacting surface 23a of the pin 23 thus obtained ranges from 700 to 900 (Hv) according to the condition of the chill treatment, usually. However, in this test, there is used the pin having a hardness of 750 (Hv). The pin 23 is formed like a small rectangular tip as shown in FIG. 5(c) and, as shown in FIG. 5(d), the slide contacting surface 23a thereof is formed round. The results of the abrasion test are listed in a table herein attached.

There are prepared first and second test pieces (A) and (B) according to the present invention. The first one (A) has the hardness of the peripheral portion (namely, softened rayer 12) of the concavity 11 ranging from 500 to 600 (Hv) and the second one (B) has the hardness thereof ranging from 800 to 900 (Hv).

Also, there are prepared three test pieces for comparison which are produced according to following conventional production methods respectively.

The first prior art test piece (I) is made as follows; a hard chromium plated layer is formed on a surface of a parent material at first, then pin-point like concavities are formed on the hard chromium plated layer (the porosity or surface ratio ranging from 10 to 20%) with use of the reversed electrolytic process and, thereafter, the surface is finished by the honing.

The second prior art test piece (II) is made as follows; at first, the surface of a parent mateial is roughed by the shot blast treatment, then, hard chrominum plate is applied to the roughed surface to form pin-point like concavities (the surface porosity ranging from 10 to 20%) and, thereafter, the surface is finished by the honing.

The third prior art test piece (III) is made as follows; hard chromium plate is applied to the surface of a parent material at first, then the hard chromium plated layer is honed and, thereafter, dimple-like concavities (the surface porosity ranging from 10 to 20%) are formed thereon by the photo-etching process.

TABLE

| | Forming method of Concavities | Type of Concavity porosity | Evaluation | |
|---|---|---|---|---|
| | | | Abrasion of Pin | Damage of Test Piece |
| Prior Art (I) | Reversed Electrolytic Process | Pin-point Type (10-20%) | 320-350 ($\mu$m) | Large |
| Prior Art (II) | Shot Blast Treatment | Pin-point Type (10-20%) | 310-360 ($\mu$m) | Large |
| Prior Art (III) | Photo-etching Process | Dimple Type (10-20%) | 180-200 ($\mu$m) | Medium |
| First Ex. (A) | Irradiation of Laser | Dimple Type (10-20%) (Hv500-600) | 95-100 ($\mu$m) | Small |
| Second Ex. (B) | Irradiation of Laser | Dimple Type (10-20%) (Hv800-900) | 100-105 ($\mu$m) | Small |

As is apparent form these test data shown in the table, the abrasion amount of the pin as a counter member is about 100 $\mu$m according to the present invention. Contrary to this, as far as the prior art test pieces concern, the abrasion amount of the pin is about 180 $\mu$m at the minimum and exceeds twice or three times of that of the present invention.

Further, the damage of the slide contacting surface of the slide contacting member according to the present invention is minimized since scratches on the surface of the counter member are reduced effectively due to the softeded layers formed on the surfaces of the concavities. Namely, the abrasion resistance is greatly improved according to the present invention.

Although the laser beam is used for forming concavities in the preferred embodiment mentioned above, the tungsten inert gas (TIG) can be used for forming concavities while applying a pressurized assist gas.

This invention may be practiced or embodied in still other ways without departing from the spirit or essential character thereof. The preferred embodiments described herein are therefore illustrative and not restrictive, the scope of the invention is being indicated by the appended claims and all variations which comes within the meaning of the claims are to be intended to be embraced therein.

What is claimed is:

1. A production method for a slide contacting member with improved abrasion resistance, comprising the following steps;
    applying a hard layer to a surface of a parent material by plating chromium thereon;
    irradiating a laser beam having a high energy density at points dispersed on said hard layer in a discrete manner while applying pressurized assist gas to each of said points to be irradiated, wherein irradiation conditions of said laser beam and the pressure of the assist gas are so chosen as to form concavities for keeping oil therein, each of which concavities has a softened layer on the concave surface thereof, said softened layer having hardness in a range from 500 to 900 of the Vickers hardness; and
    grinding said hard layer for finishing after said irradiating step.

2. A production method for a slide contacting member with improved abrasion resistance, comprising the following steps;
    applying a hard layer to a surface of a parent material by plating chromium alloy which includes a suitable amount of molybdenum;
    irradiating a laser beam having a high energy density at points dispersed on said hard layer in a discrete manner while applying pressurized assist gas to each of said points to be irradiated, wherein irradiation conditions of said laser beam and the pressure of the assist gas are so chosen as to form concavities for keeping oil therein, each of which concavities has a softened layer on the concave surface thereof, said soften layer having hardness in a range from 500 to 900 of the Vickers hardness; and
    grinding said hard layer for finishing after said irradiating step.

3. A production method for a slide contacting member with improved abrasion resistance, comprising the following steps;
    applying a hard layer to a surface of a parent material by plating chromium thereon;
    irradiating a laser beam having a high energy density at points dispersed on said hard plated layer in a discrete manner while applying pressurized assist gas to each of said points to be irradiated, wherein irradiation conditions of said laser beam and the pressure of the assist gas are so chosen as to form concavities for keeping oil therein, each of which concavities has a softened layer on the concave surface thereof; said laser beams being controlled so as to form concavities, each having a diameter falling within a range from 100 to 150 $\mu$m, on the hard plated layer in cooperation with said pressurized assist gas, said softened layer having hardness in a range from 500 to 900 of the Vickers hardness; and
    grinding said hard layer for finishing after said irradiating step.

4. A production method for a slide contacting member with improved abrasion resistance, comprising the following steps;
    applying a hard layer to a surface of a parent material by plating chromium alloy which includes a suitable amount of molybdenum thereon;
    irradiating a laser beam having a high energy density at points dispersed on said hard plated layer in a discrete manner while applying pressurized assist gas to each of said points to be irradiated, wherein irradiation conditions of said laser beam and the pressure of the assist gas are so chosen as to form concavities for keeping oil, each of which concavities has a softened layer on the concave surface thereof,
    said laser beams being controlled so as to form concavities each having a diameter falling within a range from 100 to 150 $\mu$m, on the hard plated layer in cooperation with said pressurized assist gas, said assist gas being the nitrogen gas pressurized at a pressure falling within a range from 1.0 to 3.0 kg/cm$^2$, said softened layer having hardness in a range from 500 to 900 of the Vickers hardness; and
    grinding said hard plated layer for finishing after irradiating step.

* * * * *